United States Patent
Choi et al.

(10) Patent No.: US 9,658,718 B2
(45) Date of Patent: May 23, 2017

(54) DISPLAY DEVICE INTEGRATED WITH TOUCH SCREEN

(71) Applicant: LG DISPLAY CO., LTD., Seoul (KR)

(72) Inventors: Su Min Choi, Gyeongsangbuk-do (KR); Keuk Sang Kwon, Gumi-si (KR); Seung Chul Park, Gyeongsangbuk (KR)

(73) Assignee: LG DISPLAY CO., LTD., Seoul (KR)

( * ) Notice: Subject to any disclaimer, the term of this patent is extended or adjusted under 35 U.S.C. 154(b) by 0 days.

(21) Appl. No.: 14/582,857

(22) Filed: Dec. 24, 2014

(65) Prior Publication Data
US 2015/0378512 A1 Dec. 31, 2015

(30) Foreign Application Priority Data
Jun. 30, 2014 (KR) .................. 10-2014-0080841

(51) Int. Cl.
*G09G 5/00* (2006.01)
*G06F 3/041* (2006.01)
*G06F 3/044* (2006.01)

(52) U.S. Cl.
CPC ............ *G06F 3/0418* (2013.01); *G06F 3/044* (2013.01); *G06F 3/0412* (2013.01)

(58) Field of Classification Search
CPC ...... G06F 3/044; G06F 3/0412; G06F 3/0416; G06F 2203/04112; G02F 1/13338
USPC .................................................. 345/173–178
See application file for complete search history.

(56) References Cited

U.S. PATENT DOCUMENTS

| | | | |
|---|---|---|---|
| 9,141,224 B1* | 9/2015 | Rowe ..................... | G06F 3/0414 |
| 2011/0285661 A1* | 11/2011 | Hotelling .............. | G06F 3/0418 |
| | | | 345/174 |
| 2013/0044074 A1* | 2/2013 | Park ..................... | G02F 1/13338 |
| | | | 345/174 |
| 2014/0048854 A1* | 2/2014 | Wang .................... | G06F 3/0412 |
| | | | 257/254 |
| 2014/0146246 A1* | 5/2014 | Ma ........................ | G06F 3/0412 |
| | | | 349/12 |

FOREIGN PATENT DOCUMENTS

| KR | 10-2009-0118302 A | 11/2009 |
|---|---|---|
| KR | 10-2014-0064184 A | 5/2014 |

* cited by examiner

*Primary Examiner* — Jennifer Nguyen
(74) *Attorney, Agent, or Firm* — Dentons US LLP

(57) ABSTRACT

A display device integrated with a touch screen and a method for driving the same are disclosed, in which parasitic capacitance is prevented from being generated. The display device comprises a panel including a plurality of electrodes; a rear resistance film provided on the plurality of electrodes of the panel; a touch integrated circuit (IC) applying a touch driving signal to the plurality of electrodes when a driving mode of the panel is a touch driving mode; and a gate driver sequentially applying scan signals to the plurality of gate lines and a data driver applying a data voltage to the plurality of data lines, when the driving mode of the panel is a display driving mode, wherein the touch driving signal or a signal corresponding to the touch driving signal is applied to the rear resistance film when the driving mode of the panel is the touch driving mode.

18 Claims, 3 Drawing Sheets

DISPLAY DEVICE INTEGRATED WITH TOUCH SCREEN

CROSS REFERENCE TO RELATED APPLICATIONS

This application claims the benefit of the Korean Patent Application No. 10-2014-0080841 filed on Jun. 30, 2014, which is hereby incorporated by reference for all purposes as if fully set forth herein.

BACKGROUND OF THE INVENTION

Field of the Invention

The present invention relates to a display device integrated with a touch screen.

Discussion of the Related Art

With the development of information society, various demands for display devices for displaying picture images have been increased. Recently, various display devices such as liquid crystal display (LCD), plasma display panel (PDP), and organic light emitting diode (OLED) display device have been used.

Such a display device provides a touch based input mode that enables a user to easily, intuitively and conveniently input information or command, instead of a conventional input mode such as button, keyboard, and mouse.

In order to provide such a touch based input mode, it is required to identify a touch or non-touch of a user and exactly detect a touch coordinate.

To this end, according to the related art, one of various touch modes such as a resistance film mode, a capacitance mode, an electromagnetic induction mode, an infrared mode, and an ultrasonic mode is adopted to provide touch sensing.

Among the various touch modes, the capacitance touch mode is widely adopted, which detects a touch or non-touch and a touch coordinate through a plurality of touch electrodes (for example, horizontal electrode and vertical electrode) formed in a touch screen panel on the basis of variation of capacitance between the touch electrodes or capacitance between the touch electrodes and a pointer such as a finger.

In case of the capacitance touch mode, in addition to capacitance required for touch sensing, parasitic capacitance is formed between a rear resistance film in the periphery of the touch electrodes and another voltage line (gate line and data line) and between the touch electrodes.

Load of touch driving is increased and accuracy of touch sensing is reduced due to such parasitic capacitance which is formed unnecessarily. In serious case, a problem may occur in that touch sensing becomes impossible. The problem caused by unnecessary parasitic capacitance may occur more seriously in a medium or large sized display.

Also, the problem caused by unnecessary parasitic capacitance often occurs in a display device integrated with a touch screen, in which a touch screen panel (TSP) is built in a display panel in an in-cell type, and acts as a factor that precludes realization of a medium or large sized in-cell type touch screen panel.

For example, as shown in FIG. 1, in case of a general display device integrated with an in-cell type touch screen, a panel is driven by time division in accordance with a display period and a touch period. In other words, if a driving mode of the panel is a display driving mode, a common voltage (voltage level: a) is applied to a plurality of electrodes, whereby the plurality of electrodes act as display electrodes. If the driving mode of the panel is a touch driving mode, a touch driving signal (touch signal) is applied to the plurality of electrodes, whereby the plurality of electrodes act as touch electrodes. In this touch driving mode, unnecessary parasitic capacitance occurs among a rear resistance film, a gate line, a data line, and a common electrode, whereby touch sensing accuracy may be reduced or touch sensing may become impossible.

SUMMARY OF THE INVENTION

Accordingly, the present invention is directed to a display device integrated with a touch screen and a method for driving the same, which substantially obviate one or more problems due to limitations and disadvantages of the related art.

An advantage of the present invention is to provide a display device integrated with a touch screen and a method for driving the same, in which parasitic capacitance, which increases load of touch driving, reduces touch sensing accuracy or precludes touch sensing, is prevented from being generated.

Another advantage of the present invention is to provide a medium or large sized display device integrated with a touch screen, of which realization was conventionally impossible due to parasitic capacitance.

Additional advantages and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, there is provided a display device integrated with a touch screen, which comprises a panel including a plurality of gate lines, a plurality of data lines, and a plurality of electrodes; a rear resistance film provided on the plurality of electrodes of the panel; a touch integrated circuit (IC) applying a touch driving signal to the plurality of electrodes when a driving mode of the panel is a touch driving mode; and a gate driver sequentially applying scan signals to the plurality of gate lines and a data driver applying a data voltage to the plurality of data lines, when the driving mode of the panel is a display driving mode, wherein the touch driving signal or a signal corresponding to the touch driving signal is applied to the rear resistance film when the driving mode of the panel is the touch driving mode. In this case, parasitic capacitance may be prevented from being formed between the plurality of electrodes and the rear resistance film during the touch driving mode.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Figure 1:
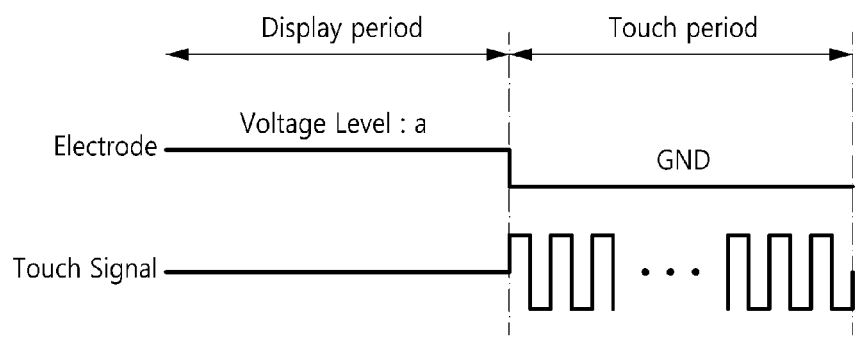
FIG. 1 is a diagram illustrating time divisional driving of a general display device integrated with a touch screen.

Reference will now be made in detail to the exemplary embodiments of the present invention, examples of which are illustrated in the accompanying drawings. Wherever possible, the same reference numbers will be used throughout the drawings to refer to the same or like parts. In the following description of the present invention, if detailed description of elements or functions known in respect of the present invention is determined to make the subject matter of the present invention unnecessarily obscure, the detailed description will be omitted.

Also, in describing elements of the present invention, terminologies such as first, second, A, B, (a) and (b) may be used. These terminologies are intended to identify one element from another element, and origin, order or the number of corresponding elements is not limited by the terminologies. The disclosure that an element is connected or coupled to another element should be understood that the element may directly be connected or coupled to another element, a third element may be interposed between the corresponding elements, or the corresponding elements may be connected or coupled to each other through a third element.

A display device integrated with a touch screen according to one embodiment of the present invention adopts a capacitance touch mode that detects a touch or non-touch and a touch coordinate on the basis of variation of capacitance through a plurality of touch electrodes formed in a touch screen panel.

This capacitance touch mode may be classified into a mutual capacitance touch mode and a self capacitance touch mode. According to the mutual capacitance touch mode, one of a horizontal electrode and a vertical electrode becomes Tx electrode (which may be referred to as driving electrode) to which a driving voltage is applied, and the other one becomes Rx electrode (which may be referred to as sensing electrode) for sensing the driving voltage and forming capacitance together with the Tx electrode, whereby a touch or non-touch and a touch coordinate are detected on the basis of variation of capacitance (mutual capacitance) between the Tx electrode and the Rx electrode depending on a pointer such as finger and pen. According to the self capacitance touch mode, a horizontal electrode or a vertical electrode forms capacitance (self capacitance) together with a pointer such as finger and pen, and a capacitance value between the horizontal electrode or the vertical electrode and the pointer is measured depending on the pointer such as finer and pen, whereby a touch or non-touch and a touch coordinate are detected on the basis of the measured capacitance value. Unlike the mutual capacitance touch mode, according to the self capacitance touch mode, a driving voltage (touch driving signal) is applied through each touch electrode and at the same time sensed in accordance with the applied touch driving signal. Accordingly, there is no identification between Tx electrode and Rx electrode in the self capacitance touch mode.

The display device integrated with a touch screen according to one embodiment of the present invention may adopt one of the aforementioned capacitance touch modes (mutual capacitance touch mode and self capacitance touch mode). In this specification, for convenience of description, the embodiments of the present invention will be described based on the self capacitance touch mode.

Figure 2:
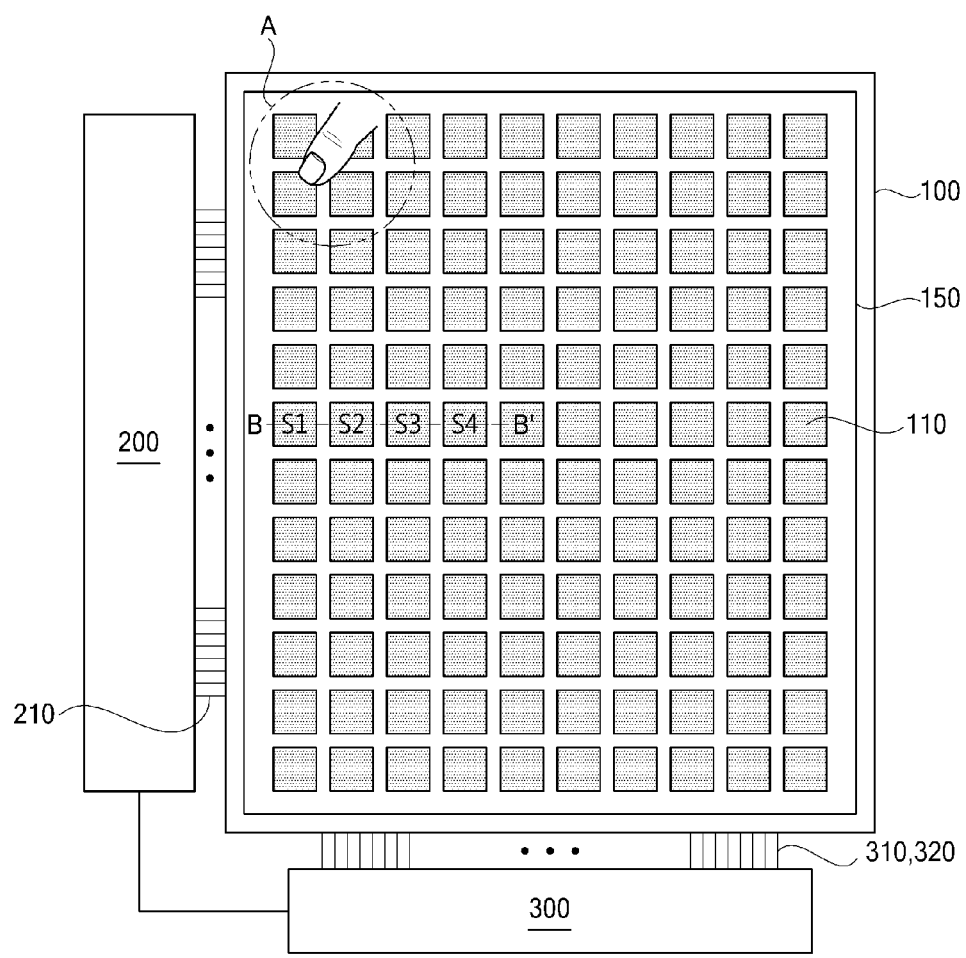
FIG. 2 is a diagram illustrating a display device integrated with a touch screen according to one embodiment of the present invention.
Figure 3:
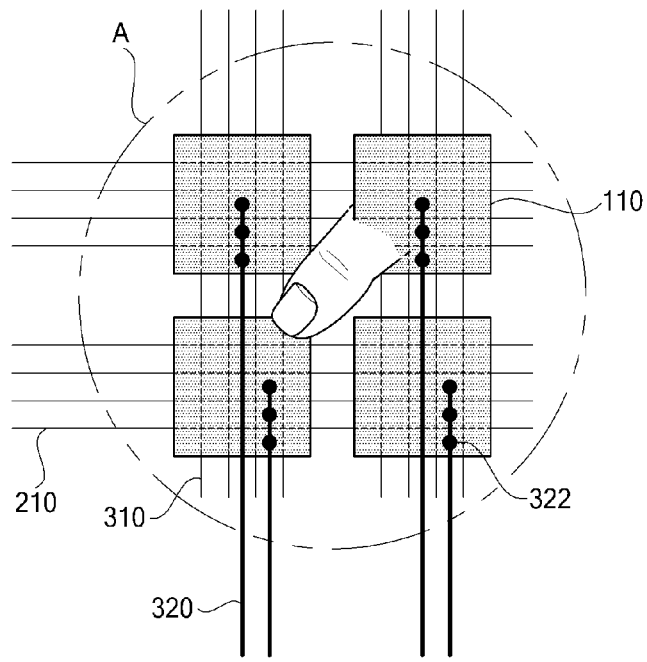
FIG. 3 is an enlarged diagram illustrating a portion A shown in FIG. 2.
Figure 4:
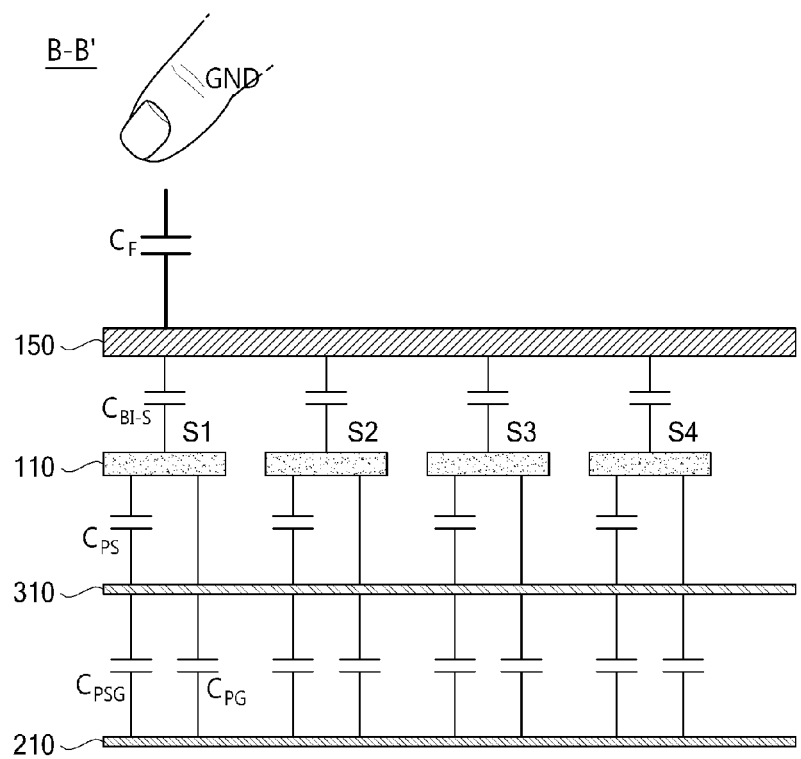
FIG. 4 is a cross sectional diagram illustrating a panel that includes a portion B shown in FIG. 2.

FIG. 2 is a diagram illustrating a display device integrated with a touch screen according to one embodiment of the present invention, FIG. 3 is an enlarged diagram illustrating a portion A shown in FIG. 2, and FIG. 4 is a cross sectional diagram illustrating a panel that includes a portion B shown in FIG. 2.

The display device integrated with a touch screen according to one embodiment of the present invention includes a panel 100, and the panel includes a TFT substrate and a color filter (C/F) substrate, which are formed with a liquid crystal layer interposed therebetween.

In other words, on the panel 100, a plurality of data lines 310 are formed in a first direction (for example, vertical direction of panel), a plurality of gate lines 210 are formed in a second direction (for example, horizontal direction of panel), and a plurality of pixels (not shown) are defined by crossing between the plurality of data lines 310 and the plurality of gate lines 210.

A transistor is formed in a pixel region of each pixel, wherein the transistor includes a source electrode or drain electrode connected with the data line, a gate electrode connected with the gate line, and a drain electrode or source electrode connected with a pixel electrode.

Also, on the panel 100, a plurality of electrodes 110 are formed, wherein the plurality of electrodes are driven as touch electrodes for sensing a touch input of the panel in accordance with a touch driving signal applied thereto if a driving mode of the panel 100 is a touch driving mode, and the plurality of electrodes are driven as common electrodes for displaying images by forming electric field together with the pixel electrode formed in the panel in accordance with a common voltage applied thereto if the driving mode of the panel 100 is a display driving mode. Although the plurality of electrodes may be formed on the TFT substrate of the panel, the electrodes may also be formed on the C/F substrate.

The aforementioned panel 100 may serve as a touch screen panel (TSP) while serving as a display panel by using the plurality of electrodes which are operated as the touch electrodes and the common electrodes depending on the driving mode of the panel.

In other words, the panel 100 may be referred to as a panel formed by a display panel and a touch screen panel, which are integrated with one, or may be referred to as a display panel in which a touch screen panel is built in an in-cell type.

If the panel 100 serves as the display panel, the driving mode of the panel will be defined as the display driving mode, and if the panel 100 serves as the touch screen panel, the driving mode of the panel 100 will be defined as the touch driving mode.

Next, the display device integrated with a touch screen according to one embodiment of the present invention may additionally include a rear resistance film 150 on the plurality of electrodes 110 as shown in FIGS. 2 and 4. In this case, the rear resistance film 150 is formed to adjoin an upper portion of the CF substrate constituting the panel, and may be formed by AS Pol and Y1 Coating. Especially, the rear resistance film 150 of the present invention may be formed of a transparent electrode such as ITO, and a touch driving signal or a signal corresponding to the touch driving signal may be applied to the rear resistance film 150 in case of the touch driving mode, whereby parasitic capacitance that may occur together with the plurality of electrodes may be reduced.

In this case, if the rear resistance film is formed of a transparent electrode such as ITO, parasitic capacitance formed between the plurality of electrodes and the rear resistance film is greater than that formed when a general rear resistance film is used.

Next, the display device integrated with a touch screen according to one embodiment of the present invention includes a gate driver 200 and a data driver 300 as shown in FIG. 2.

Namely, if the driving mode of the panel is the display driving mode, the display device includes a gate driver 200 for sequentially supplying scan signals to the plurality of gate lines, and a data driver 300 for supplying a data voltage to the plurality of data lines.

In this case, if the driving mode of the panel 100 is the display driving mode, the gate driver 200 sequentially supplies scan signals for display to the plurality of gate lines 210.

In other words, the gate driver 200 applies a data voltage to the pixels of the panel for a display period by supplying gate signals, which are the scan signals for display, to the gate lines 210.

For example, the gate driver 200 selects a line of the panel to which the data voltage is input, by supplying the gate signals to the gate lines, and the pixels of the panel charge the data voltage Vdata input from the data driver for the display period in response to the gate signals.

The data driver 300 applies a data voltage Vdata for display to the plurality of data lines 310 if the driving mode of the panel 100 is the display driving mode.

Namely, the data driver 300 converts RGB data input from a timing controller (not shown) to a data voltage and outputs the converted voltage. The data voltage output from the data driver is supplied to the data lines 310.

In other words, the data driver 300 generates a sampling signal by shifting a source start pulse SSP from the timing controller (not shown) in accordance with a source shift clock SSC. And, the data driver 300 changes pixel data RGB (image data) input in accordance with the source shift clock SSC to a data signal by latching the pixel data RGB in accordance with the sampling signal. Afterwards, the data driver 300 supplies the data signal to the data lines in a unit of horizontal line in response to a source output enable SOE signal. The data signal includes the data voltage.

To this end, the data driver 300 may include a data sampling unit, a latch unit, a digital-to-analog converter, and an output buffer. Also, the data driver 300 may include a touch integrated circuit (IC) as shown in FIG. 2.

For reference, the aforementioned timing controller generates control signals GCS and DCS for controlling operation timing of the gate driver 200 and the data driver 300 by receiving timing signals such as a vertical synchronization signal Vsync, a horizontal synchronization signal Hsync, a data enable signal DE, and a main clock CLK from a system unit (not shown), and realigns the RGB data input from the system unit and outputs the realigned RGB data to the data driver 300.

Next, the display device integrated with a touch screen according to one embodiment of the present invention includes a touch IC. Although the touch IC may be formed inside the data driver 300 or in one chip together with the data driver as shown in FIG. 2, the touch IC may be formed inside the gate driver depending on a size or shape of the panel, or may be formed outside the gate driver and the data driver.

The aforementioned touch IC applies a touch driving signal to all or some of the plurality of electrodes 110 if the driving mode of the panel 100 is the touch driving mode. In this case, the touch driving signal may be referred to as a touch sensing signal, touch sensing voltage or touch driving voltage (Vtd: touch voltage).

For example, the touch IC applies the touch driving signal to the plurality of electrodes if the driving mode of the panel 100 is the touch driving mode. In this case, the touch IC may apply the touch driving signal to all or some of a plurality of electrode groups if the plurality of electrodes are grouped.

Also, the touch IC detects a touch or non-touch and a touch coordinate by receiving sensing data (for example, capacitance, variance of capacitance, voltage, etc.) measured by the touch IC through the plurality of electrodes 110 serving as the touch electrodes. To this end, the touch IC may further include a touch controller (not shown).

Meanwhile, the panel 100 of the display device integrated with a touch screen according to one embodiment of the present invention is driven by repeating the display driving mode and the touch driving mode. Timing of the display driving mode and the touch driving mode may be controlled by the control signal output from the timing controller or the touch controller, or may be controlled by interaction of the timing controller and the touch controller as the case may be.

The touch IC may apply the touch driving signal to all or some of the plurality of electrodes 110 through the data driver 300 or the gate driver 200. Although the touch IC applies the touch driving signal to the plurality of electrodes through the data driver in FIG. 2, the present invention is not limited to the example of FIG. 2.

For reference, for display driving, the common voltage is transmitted to each of the plurality of electrodes through signal lines 320.

A formation direction of at least one signal line connected to each of the plurality of electrodes may be varied depending on whether the touch driving signal or the common voltage is transmitted through the data driver or the gate driver.

If the touch driving signal or the common voltage is transmitted to the plurality of electrodes through the data driver, signal lines for connecting the data driver with the plurality of electrodes may be formed in parallel with the direction in which the plurality of data lines are formed. This case is shown in FIG. 3.

However, if the touch driving signal or the common voltage is transmitted to the plurality of electrodes through the gate driver, signal lines for connecting the gate driver with the plurality of electrodes may be formed in parallel with the direction in which the plurality of gate lines are formed.

As described above, the signal lines for allowing the touch driving signal generated in the touch IC to be transmitted to the plurality of electrodes through the data driver or the gate driver are formed.

The signal lines 320 may be formed in the TFT substrate region corresponding to a black matrix region formed in the C/F substrate of the panel 100 to prevent an aperture ratio from being reduced.

If the plurality of electrodes 110 are connected with the respective signal lines through two or more contact holes 322, resistance between the plurality of electrodes and the signal lines may be reduced.

FIG. 4 illustrates capacitance components generated during a touch driving mode in a display device integrated with a touch screen according to one embodiment of the present invention.

Referring to FIG. 4, although the plurality of electrodes 110 serving as touch electrodes S1, S2, S3 and S4 in case of the touch driving mode and serving as common electrodes for forming a pixel electrode and a liquid crystal capacitor in case of the display driving mode may form capacitance Cf together with a pointer such as finger and pen to detect a touch or non-touch and a touch coordinate in case of the touch driving mode, the electrodes may form parasitic capacitance together with the data lines 310, the gate lines 210 and the rear resistance film 150, which are intended for display.

In more detail, in accordance with the touch driving signal applied to the plurality of electrodes S1, S2, S3 and S4 110 in case of the touch driving mode, parasitic capacitance CBI-S may be formed between the plurality of electrodes 110 and the rear resistance film 150, parasitic capacitance CPG may be formed between the plurality of electrodes 110 and the gate lines 210, and parasitic capacitance CPS may be formed between the plurality of electrodes 110 and the data lines 310. Also, capacitance CPSG formed between the gate lines 210 and the data lines 310 may form parasitic capacitance together with the plurality of electrodes.

Parasitic capacitance Cp generated during the touch driving mode acts as great load if a touch input is sensed in the touch driving mode, deteriorates touch sensing accuracy or precludes touch sensing. Such parasitic capacitance Cp may become great if the size of the display device or the display panel becomes great, whereby a greater problem in touch sensing may be caused.

Figure 5:
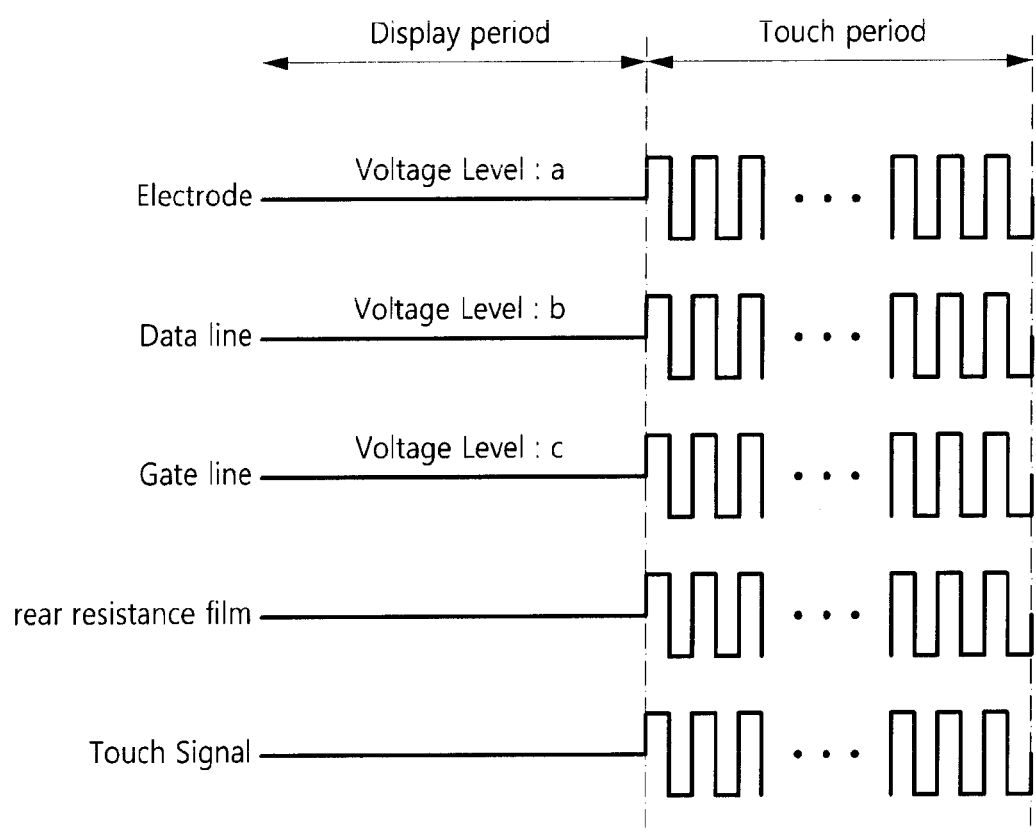
FIG. 5 is a diagram illustrating an example of applying a driving signal of a display device integrated with a touch screen according to one embodiment of the present invention.

In this respect, in the embodiment of the present invention, as shown in FIG. 5, a ground voltage GND is applied to the rear resistance film (rear ITO) 150 in the display driving mode, and the touch driving signal applied to the plurality of electrodes used as touch electrodes in the touch driving mode or the signal corresponding to the touch driving signal is applied to the rear resistance film (rear ITO) 150 in the touch driving mode so as not to form unnecessary parasitic capacitance CBI-S between the plurality of electrodes 110 serving as touch electrodes and the rear resistance film (rear ITO) 150.

In this case, the signal corresponding to the touch driving signal may be either the signal of the same phase as that of the touch driving signal or the signal modulated to a pulse of the same size as that of the touch driving signal.

As described above, if the touch driving signal (touch sensing voltage) or the signal corresponding to the touch driving signal is applied to the rear resistance film 150, potential difference is not generated between the electrodes used as the touch electrodes and the rear resistance film 150 during the touch driving mode, whereby parasitic capacitance CBI-S is not formed between the electrodes used as the touch electrodes and the rear resistance film 150.

For example, referring to FIG. 4, if the ground voltage GND applied to the rear resistance film in the display driving mode is applied to the rear resistance film (rear ITO) even in the touch driving mode equally to general driving, variance of capacitance for touch sensing becomes (CF*CBI-S)/(CF+CBI-S) due to capacitance CF generated during a touch input of the user and parasitic capacitance CBI-S formed between the plurality of electrodes and the rear resistance film 150. If the touch driving signal (touch sensing voltage) or the signal corresponding to the touch driving signal is applied to the rear resistance film 150 in the touch driving mode like driving according to one embodiment of the present invention, potential difference is not generated between the electrodes used as the touch electrodes and the rear resistance film 150, whereby parasitic capacitance CBI-S is not formed between the plurality of electrodes used as the touch electrodes and the rear resistance film 150 and thus variation of capacitance for touch sensing becomes CF.

Namely, if the touch driving signal (touch sensing voltage) or the signal corresponding to the touch driving signal is applied to the rear resistance film 150 during the touch driving mode, variation of capacitance for touch sensing is greater than that of a general driving method, whereby touch sensing sensitivity may be improved.

For reference, if the rear resistance film is formed of ITO, parasitic capacitance formed between the plurality of electrodes and the rear resistance film 150 is greater than that in a general embodiment, driving according to one embodiment of the present invention is necessarily required.

In addition to the aforementioned driving method, instead of applying the touch driving signal (touch sensing voltage) or the signal corresponding to the touch driving signal to the rear resistance film, even in the case that driving is performed simply in a floating state, parasitic capacitance CBI-S between the electrodes used as the touch electrodes and the rear resistance film 150 may be reduced.

Also, in the embodiment of the present invention, a specific voltage (voltage level: C), which may drive the gate lines, may be applied to the gate lines 210 in the display driving mode as shown in FIG. 5, and the touch driving signal applied to the plurality of electrodes used as the touch electrodes or the signal corresponding to the touch driving signal is applied to the gate lines 210 in the touch driving mode so as not to form unnecessary parasitic capacitance CPG between the plurality of electrodes used as the touch electrodes and the gate lines.

In this case, the signal corresponding to the touch driving signal may be either the signal of the same phase as that of the touch driving signal or the signal modulated to a pulse of the same size as that of the touch driving signal.

As described above, if the touch driving signal (touch signal) or the signal corresponding to the touch driving signal is applied to the gate lines 210, potential difference is not generated between the electrodes used as the touch electrodes and the gate lines 210 during the touch driving mode, whereby parasitic capacitance CPG is not formed between the electrodes used as the touch electrodes and the gate lines 210.

Also, as shown in FIG. 5, a specific voltage (voltage level: C) suitable for the data lines 310 is applied to the data lines 310 in the display driving mode, and the touch driving signal (touch signal) applied to the plurality of electrodes used as the touch electrodes or the signal corresponding to the touch driving signal is applied to the data lines 310 in the touch driving mode so as not to form unnecessary parasitic capacitance CPS between the plurality of electrodes 110 serving as the touch electrodes and the data lines 310.

In this case, the signal corresponding to the touch driving signal may be either the signal of the same phase as that of the touch driving signal or the signal modulated to a pulse of the same size as that of the touch driving signal.

As described above, if the touch driving signal (touch signal) or the signal corresponding to the touch driving signal is applied to the data lines 310, potential difference is not generated between the electrodes used as the touch electrodes and the data lines 310 during the touch driving mode, whereby parasitic capacitance CPS is not formed between the electrodes used as the touch electrodes and the data lines 310.

According to additional embodiment, if the plurality of electrodes are grouped, a common voltage (voltage level: a) is applied to all of the plurality of electrodes in the display driving mode as shown in FIG. 5, and the touch driving signal (touch signal) or the signal corresponding to the touch driving signal is applied to the other groups in addition to the group to which the touch driving signal is applied, in the touch driving mode, whereby parasitic capacitance CPS is not formed between the touch electrode groups driven per group.

As described above, the touch driving signal applied to the plurality of electrodes serving as the touch electrodes or the signal corresponding to the touch driving signal is applied to the rear resistance film, the gate lines, and the data lines during the touch driving mode, whereby RC load caused by parasitic capacitance, which may be formed between the electrodes used as the touch electrodes and another elements of the panel, may be removed, and sensing sensitivity may be improved. Also, the touch screen panel of an In-Cell mode may be realized even in a medium or large sized display as well as a small sized display.

The display device integrated with a touch screen according to one embodiment of the present invention may further include a pulse generator for generating the touch driving signal or the signal corresponding to the touch driving signal. The pulse generator may be formed outside the gate driver, the data driver and the touch IC, or may be formed inside the gate driver, the data driver and the touch IC.

For example, the pulse generator may generate the touch driving signal or the signal corresponding to the touch driving signal and apply the generated signal to the gate line through the gate driver and apply the generated signal to the data line through the data driver. This pulse generator may be the element included in the gate driver or the data driver, or may externally be connected with the gate driver or the data driver.

The pulse generator may generate the touch driving signal or the signal corresponding to the touch driving signal and apply the generated signal to the rear resistance film through the gate driver, the data driver or the touch IC. This pulse generator may be the element included in the gate driver or the data driver, or may externally be connected with the gate driver or the data driver.

Although the pulse generator may be the element included in the gate driver, the data driver or the touch IC, the pulse generator may be the independent element separately from the gate driver, the data driver and the touch IC.

According to the present invention described as above, the display device integrated with a touch screen, which prevents parasitic capacitance from being formed, may be provided, wherein the parasitic capacitance may increase load of touch driving, deteriorate touch sensing accuracy, or preclude touch sensing.

Also, according to the present invention, the medium or large sized display device integrated with a touch screen, which could not have realized conventionally due to parasitic capacitance, may be provided.

As described above, according to the present invention, the following advantages may be obtained.

First of all, parasitic capacitance between the rear resistance film and the touch electrodes, which may increase load of touch driving and reduce touch sensing or preclude touch sensing during the touch driving mode, may be reduced, whereby the display device integrated with a touch screen, which improve touch sensing sensitivity and touch accuracy, may be provided.

Also, according to the present invention, parasitic capacitance between the gate lines or the data lines and the touch electrodes, which may increase load of touch driving and reduce touch sensing or preclude touch sensing during the touch driving mode, may be reduced, whereby the display device integrated with a touch screen, which improve touch sensing sensitivity and touch accuracy, may be provided.

Also, according to the present invention, the touch driving signal or the signal of the same phase as that of the touch driving signal is applied to the rear resistance film, the gate lines and the data lines, whereby parasitic capacitance between the gate lines or the data lines and the touch electrodes may be reduced.

As a result, according to the present invention, the medium or large sized display device integrated with a touch screen, which could not have realized conventionally due to parasitic capacitance, may be provided.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A display device integrated with a touch screen, the display device comprising:
   a panel including a plurality of gate lines, a plurality of data lines, and a plurality of electrodes;
   a rear resistance film provided on the plurality of electrodes of the panel to reduce a parasitic capacitance between the rear resistance film and the plurality of electrodes;
   a touch integrated circuit (IC) applying a touch driving signal to the plurality of electrodes if a driving mode of the panel is a touch driving mode; and
   a gate driver sequentially applying scan signals to the plurality of gate lines and a data driver applying a data voltage to the plurality of data lines when the driving mode of the panel is a display driving mode,
   wherein the touch driving signal or a signal corresponding to the touch driving signal generated in the touch IC is applied to the rear resistance film, the plurality of gate lines, and the plurality of data lines when the driving mode of the panel is the touch driving mode.

2. The display device of claim 1, wherein the signal corresponding to the touch driving signal is a signal of a same phase as that of the touch driving signal.

3. The display device of claim 1, wherein the signal corresponding to the touch driving signal is a signal modulated to a pulse of a same size as that of the touch driving signal.

4. The display device of claim 1, wherein the touch driving signal or the signal corresponding to the touch driving signal is applied to the rear resistance film through the touch IC.

5. The display device of claim 1, further comprising a pulse generator generating the touch driving signal or the signal corresponding to the touch driving signal.

6. The display device of claim 5, wherein the pulse generator is provided outside the gate driver, the data driver and the touch IC.

7. The display device of claim 5, wherein the pulse generator is provided inside the gate driver or the data driver, or is provided inside the touch IC.

8. The display device of claim 1, wherein the rear resistance film is an indium tin oxide (ITO) film.

9. The display device of claim 1, wherein at least one signal line connected to each of the plurality of electrodes, transmitting the touch driving signal is provided in the panel in a direction of the data lines.

10. The display device of claim 9, wherein the at least one signal line is connected with each of the plurality of electrodes through at least two contact holes.

11. The display device of claim 1, wherein the gate driver applies the touch driving signal or the signal corresponding to the touch driving signal to the plurality of gate lines when the driving mode of the panel is the touch driving mode.

12. The display device of claim 1, wherein the data driver applies the touch driving signal or the signal corresponding to the touch driving signal to the plurality of data lines when the driving mode of the panel is the touch driving mode.

13. The display device of claim 1, wherein the touch IC is provided inside the data driver.

14. The display device of claim 1, wherein the touch IC is provided outside the data driver or the gate driver.

15. The display device of claim 1, wherein the plurality of electrodes are driven as touch electrodes for sensing a touch input of the panel in accordance with the applied touch driving signal when the driving mode of the panel is the touch driving mode, and the plurality of electrodes are driven as common electrodes for generating electric field together with a pixel electrode provided in the panel in accordance with a common voltage, which is applied, and displaying images, when the driving mode of the panel is the display driving mode.

16. The display device of claim 1, wherein the rear resistance film is formed to adjoin an upper portion of a color filter (CF) substrate constituting the panel.

17. The display device of claim 1, wherein the rear resistance film is formed by AS Pol and Y1 Coating.

18. The display device of claim 1, wherein the rear resistance film additionally reduces a parasitic capacitance between the rear resistance film and a touch input. the display driving mode.

* * * * *